United States Patent Office 3,470,497

Patented Sept. 30, 1969

3,470,497

CIRCUIT ARRANGEMENT FOR SIGNALLING THE UPPER AND LOWER LIMITS OF A VOLTAGE

Helmut Kotter, Schnaittach, Germany, assignor to Felten & Guilleaume Fernmeldeanlagen G.m.b.H., Nuremberg, Germany, a German company Filed Nov. 9, 1966, Ser. No. 593,219
Int. Cl. G05f *1/40, 1/60;* H02p *13/14*
U.S. Cl. 323—22 8 Claims

ABSTRACT OF THE DISCLOSURE

Electronic circuits for providing an output signal whenever the input signal varies above and below predetermined limits. These output signals are provided by triggering circuitry which may change from conductive to non-conductive or vice versa when the respective limits are exceeded and are biased to the respective conditions through a pair of transistors connected as a phase splitter circuit to a reference voltage and to the input signal to provide the desired bias operating signals to the triggering circuitry. Various connections provide more or less refinement of the results.

The invention relates to a circuit arrangement for signalling the upper and lower limits of a voltage.

The use of two separate, differently dimensioned trigger circuits is known for signalling the upper and lower limits of a voltage, one of these being switched in on reaching the upper limit whilst the other is switched out on reaching the lower limit. Such an arrangement however has the disadvantage that the trigger for the lower limit is conductive for normal values of the voltage being monitored, and presents a non-linear load for the voltage source being monitored. Further disadvantages are that the output criteria for both trigger circuits are not equal when the limit is exceeded and that it is relatively difficult to make the "hysteresis," i.e. the difference between the cut-in voltage and the fall-out voltage, of a trigger dimensioned for low circuit voltages sufficiently small and independent of the driving voltage and of the deviations in the transistor parameters.

Furthermore, a circuit arrangement is known in which trigger circuits are connected to a customary differential amplifier for signalling the limits. This arrangement is extremely well suited for signalling limits lying close to each other; however, it has the disadvantage that the control voltages for the trigger are related to a side of the source of driving voltage which is different from that of the voltage to be monitored, which in many cases causes difficulty with reference to coupling in the trigger. Besides, if voltage limits lying far apart are to be signaled, difficulties are encountered in designing the differential amplifier.

An object of this invention is the provision of an improved electronic circuit for providing an indication of an input signal passing through pre-arranged upper and lower limits.

In accordance with the present invention an electronic circuit includes triggering circuitry providing an output signal signifying the excursion of an input signal through pre-arranged upper and lower limits. The circuit contains a phase splitter formed by a complementary pair of transistors having the collector of the first transistor, to the base of which the input signal is applied, connected to the emitter of the second transistor and through a resistance to one side of a D.C. or other unidirectional electrical supply. A source of auxiliary or reference voltage is connected between the base of the second transistor and said one side of the electrical supply, and two resistors are connected between the other side of the electrical supply and, respectively, the emitter of the first transistor and the collector of the second transistor. Electrical connections extend from an output terminal of the phase splitter to the triggering circuitry for triggering it when the input signal crosses the lower limit, and, further connections extend from the input circuit of the first transistor to the triggering circuitry for triggering it when the input signal crosses the upper limit.

Preferably the first transistor has its emitter and collector connected to respective sides of the supply through the same ohmic values of resistance. The triggering control voltage of the portion of the triggering circuitry which responds to the upper limit being exceeded may be taken directly from the input terminal of the circuit suitably formed by the base of the first transistor. Preferably, however, the triggering control voltage is obtained from the emitter of the first transistor which is suitably connected so as to behave as an emitter follower.

In order to compensate for the base-emitter voltage of the second transistor on the behavior of the triggering circuitry, a rectifier is preferably connected in series with the reference voltage source between the base of the second transistor and the first side of the electrical supply. Where the first side is positive, the rectifier suitably has its cathode connected to the base of the second transistor and through a resistance to the other side of the supply, the anode of the rectifier being connected to the reference voltage source.

The temperature fluctuations will normally vary the base-emitter current of the first transistor and the effect of this on the control voltage fed to the portion of the triggering circuitry which responds to the upper limit of input signal voltage being exceeded may be reduced by connecting a diode, in the low resistance direction, in said further connections. In this form of circuit the resistances connecting the emitter and collector of the first transistor to respective sides of the supply are preferably equal.

The triggering circuitry may comprise a single trigger circuit or separate trigger circuits so chosen that the numerical value of their relative hystereses for the two limits are the same. Thus, if $U_H'$ is the hysteresis voltage of the trigger circuit which responds to the upper limit $U_1'$ of input signal voltage, and $U_H''$ is the hysteresis voltage for the trigger circuit which responds to the input signal passing through the lower voltage limit $U_1''$, then $$\left|\frac{U_H'}{U_1'}\right| = \left|\frac{U_H''}{U_1''}\right|$$

The invention will now be described in more detail, by way of examples, with reference to the accompanying drawings which show, in FIGURES 1 to 6 respectively, six different electronic circuits providing output signals from trigger circuitry to denote upper and lower voltage limits of an input voltage $U_1$ being exceeded. All of the circuits employ a transistorized phase splitter formed by a complementary pair of transistors referenced T1 and T2 in all of the figures. Similarly operating components are similarly referenced and only FIGURE 1 will be described in detail to save needless repetition. Of course, where features of other figures differ from FIGURE 1 then the distinctions alone will be dealt with in the ensuing descriptions of the individual figures.

Figure 1:
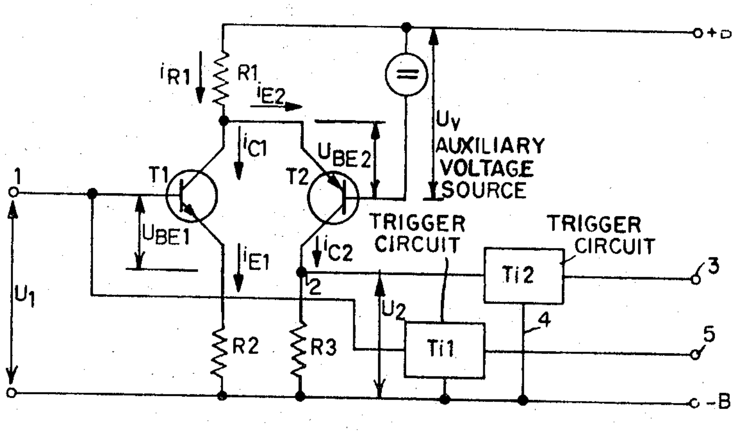
FIG. 1 is a schematic diagram of triggering circuitry biased to its relative operative conditions by a pair of transistors forming a phase splitter circuit for controlling the triggering circuitry in response to predetermined upper and lower limits of input signal voltage.

Referring to FIGURE 1, the base of transistor T1 receives an input signal voltage $U_1$ applied between a terminal 1 and a line referenced —B. Transistor T1 is of N.P.N. type and has an emitter load resistor R2 and a collector load resistor R1. The collector of transistor T1 is connected to the emitter of a transistor T2 which is of P.N.P. type and has a reference voltage $U_v$ continuously applied to its base. The collector of transistor T2 is connected through a load resistor R3 to the line —B, and, by way of a terminal 2, to the input of a trigger circuit T*i*2 having an output terminal 3 and a connection 4 extending to the line —B. A second trigger circuit T*i*1 has its input applied between the line —B and the input terminal 1, and provides an output signal at a terminal 5 when triggered.

Trigger circuit T*i*1 is triggered between its conducting and non-conducting conditions by excursion of the input voltage $U_1$ from a normal operating range through its upper limit, and trigger circuit T*i*2 is triggered between its two conditions by the input voltage $U_1$ passing through the lower limit to its range.

In FIGURE 1 the base emitter voltages of the two transistors are signified by $U_{BE1}$ and $U_{BE2}$; the collector currents are signified by $i_{C1}$ and $i_{C2}$; the emitter currents are signified by $i_{E1}$ and $i_{E2}$, and the load resistor R1 current is referenced $i_{R1}$. The amplification of transistor T1 is very much greater than unity.

Transistor T1 is normally conducting when the input signal $U_1$ is within its upper and lower limits and is so arranged that its emitter and base currents are substantially equal. In these conditions the collector current of transistor T1 is given by the equation:

$$i_{C1} \approx \frac{U_1 - U_{BE1}}{R_2} \quad (1)$$

The transistor T2, which is of the opposite type of conductivity, maintains the voltage drop across resistor R1 substantially constant at a value $U_v - U_{BE2}$, so that the aggregate current $i_{R1}$ flowing through resistor R1 is given by the equation:

$$i_{R1} = \frac{U_v - U_{BE2}}{R1} \quad (2)$$

Obviously, the emitter current of transistor T2 must be the difference in current represented by the Equations 1 and 2 and therefore this emitter current may be expressed by:

$$i_{E2} = \frac{U_v - U_{BE2}}{R1} - i_{C1} \approx \frac{U_v - U_{BE2}}{R1} - \frac{U_1 - U_{BE1}}{R2} \quad (3)$$

The transistor T2, like transistor T1, has an amplification very much greater than unity and has a collector current $i_{C2}$ corresponding approximately to the emitter current $i_{E2}$ and flowing through the collector load R3. This produces an input voltage $U_2$ across the input terminals of the trigger circuit T*i*2 which may be expressed by the equation:

$$U_2 = i_{C2}R3 \approx i_{E2}R3 = (U_v - U_{BE2})\frac{R3}{R1} - (U_1 - U_{BE1})\frac{R3}{R2} \quad (4)$$

If one arranges for R1 and R2 to have the same resistance, then Equation 4 becomes:

$$U_2 \approx [U_v - U_1 - (U_{BE2} - U_{BE1})]\frac{R3}{R2} \quad (5)$$

As the difference between the base-emitter voltages for the two transistors T1, T2 is very small Equation 5 reduces to $$U_2 (U_v - U_1)\frac{R3}{R2}$$

Thus the trigger circuit inputs $U_2$, $U_1$ vary only with $U_v$, R3 and R2 all of which may be held constant so that the trigger circuits response is substantially unaffected by extraneous factors.

The arrangement of FIGURE 1 operates by the trigger circuit T*i*1 response to the input voltage $U_1$ exceeding the upper limit by being switched into the conductive condition, whereas the second trigger circuit T*i*2 responds to the input voltage $U_1$ falling beneath the lower limit by being switched into the non-conductive condition. Obviously, the upper and lower limits could equally well be denoted by reversing the conductivity of the trigger circuits, so that when the upper limit is exceeded the trigger circuit T*i*1 is rendered non-conductive, while when the lower limit is crossed, the trigger circuit T*i*2 is rendered conductive. The circuitry requirement being that the triggering circuits provide a predetermined conductivity response at the respective upper and lower limits. A disadvantage of the arrangement of FIGURE 1 is that the trigger circuit T*i*1 offers a relatively large non-linear load to the input voltage $U_1$ when the upper limit is exceeded.

Figure 2:
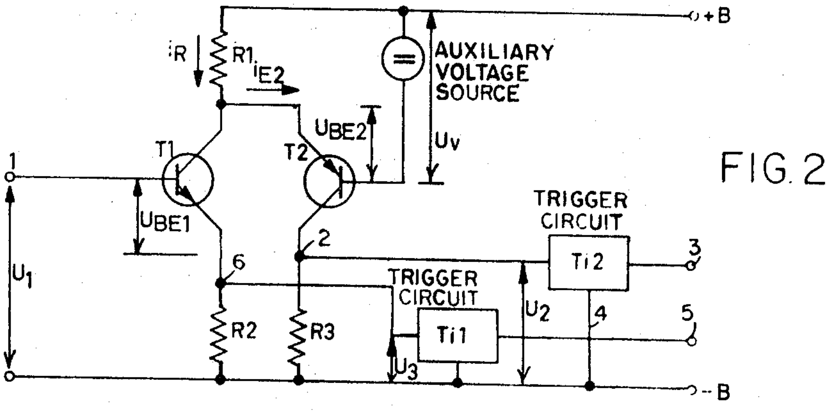
FIG. 2 shows a variation of FIG. 1 in which the triggering circuitry is more linearly responsive to the input signal voltage.

The circuit shown in FIGURE 2 obviates this disadvantage by having the input side of the trigger circuit T*i*1 connected across the emitter load R2 of the transistor T1 which therefore behaves as an emitter follower circuit so preventing low fluctuations of the trigger circuit T*i*1 being reflected back to the source of Voltage $U_1$. In the circuit of FIGURE 2 the control voltage applied to the trigger circuit T*i*1 is then:

$$U_3 = U_1 - U_{BE1} \quad (6)$$

and the control voltage $U_2$ for the second trigger circuit T*i*2, which is taken from the terminal 2, is the same as is expressed in Equation 4 above, namely, $U_2$ is proportional to $$U_2 \approx (U_v - U_{BE2})\frac{R3}{R1} - (U_1 - U_{BE1})\frac{R3}{R2}$$

Figure 3:
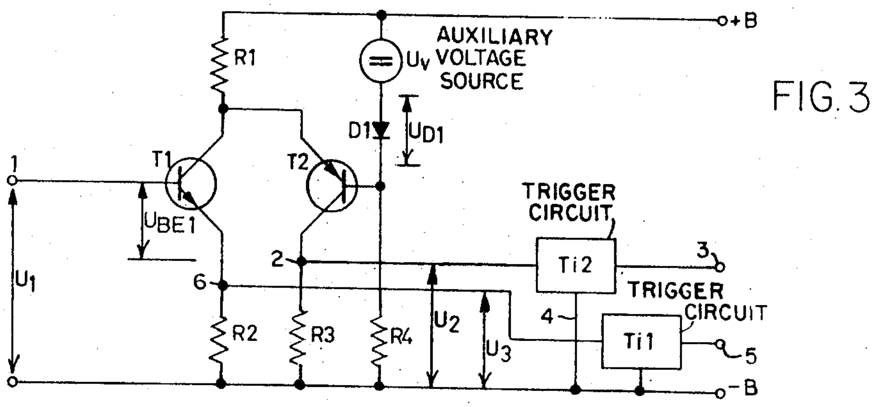
FIG. 3 is another variation for reducing the influence of the input voltage to the low voltage limit trigger on the operation of its transistor in the phase splitter circuit.

FIGURE 3 shows a modification of the circuit of FIGURE 2 designed to reduce the influence on the control voltage $U_2$ of the base-emitter voltage of the transistor T2. For this purpose the base circuit of transistor T2 has the reference voltage $U_v$ connected in series with a diode D1 having its cathode connected to the base of transistor T2 and a voltage drop across it, when conducting, of $U_{D1}$. The presence of rectifier D1 reduces the base-emitter voltage $U_{BE2}$ by the extent of $U_{D1}$. In this way the influence of the base-emitter voltage of transistor T2 on the control voltage $U_2$ is reduced.

Figure 4:
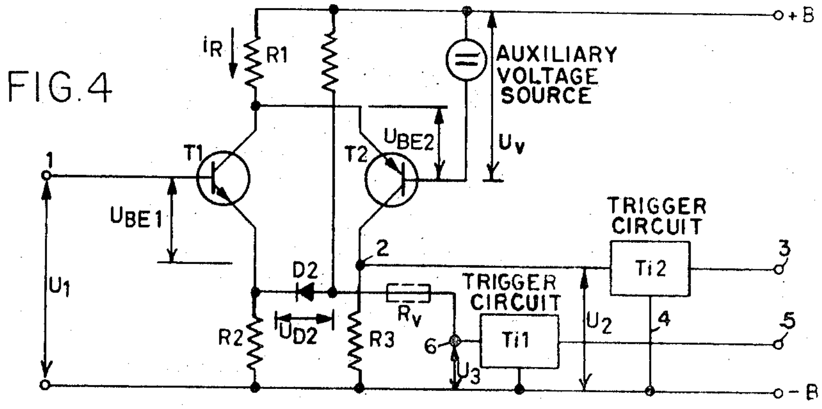
FIG. 4 shows a further modification of the FIG. 2 circuitry for reducing the influence of the input voltage to the upper voltage limit trigger on the operation of its transistor in the phase splitter circuit.

FIGURE 4 shows a further modification of the circuit shown in FIGURE 2 and is designed to reduce the influence of the base-emitter voltage of the transistor T1 on the control voltage $U_3$ applied across the input terminals of the trigger circuit T*i*1. This is achieved by means of a diode D2 having its cathode connected to the emitter of the transistor T1 so that the control voltage $U_3$ is obtained from its anode. The volt drop across the diode D2 is $U_{D2}$. The control voltage for the trigger circuit T*i*1 is now given by the equation:

$$U_3 = U_1 - (U_{BE1} - U_{D2}) \quad (7)$$

and the control voltage for the trigger circuit T*i*2, assuming once again that the emitter and collector resistors R1 and R2 of transistor T1 are made the same, is given by Equation 5 as:

$$U_2 = [U_v - U_1 - (U_{BE2} - U_{BE1})] \cdot \frac{R3}{R2}$$

It will be noticed that the base-emitter voltages are to a large extent self-cancelling in the equation directly above so that the influence they have on the control voltage $U_2$ is small and, in Equation 7 above, the effect of the base-emitter voltage of the transistor T1 on the control voltage $U_3$ is greatly reduced by the presence of the diode D2.

To obtain identical response times it is convenient to use identical trigger circuits T*i*1 and Ti2. In this case the internal resistances of the voltage source $U_2$ and $U_3$ should be the same. This can be achieved, as shown in FIGURE 4, by introducing a resistor R*v* in the circuit between the anode of the diode D2 and the terminal 6 on the input side of the trigger circuit Ti1. The value of the internal resistance R*i*($U_3$) of voltage source $U_3$ is small in most cases and is given by:

$$Ri(U_3) = \frac{Ri(U_1)}{B1}$$

where R*i*($U_1$) is equal to the internal resistance of the voltage source $U_1$ to be monitored, and B1 is the current amplification of the transistor T1.

If $U_1'$ is equal to the upper limit of the input voltage $U_1$, and $U_1''$ is equal to the lower limit of the input voltage $U_1$, the rise of the input signal voltage $U_1$ above $U_1'$ is signified by operation of the trigger circuit T*i*1, whereas fallen input voltage $U_1$ beneath the lower limit $U_1''$ is signified by operation of the trigger circuit T*i*2. By making both trigger circuits identical to one another they are capable of beng switched by identical input switching potentials $U_s$ and to have the same hysteresis voltage $U_H$ which is the difference between the voltages applied to each of the trigger circuits to switch it to its conducting condition and to its non-conducting condition.

The trgger circuit to respond to the upper limit $U_1'$ of the input voltage has a hysteresis voltage $U_H'$, and the trigger circuit to respond to the lower limit of input voltage $U_1''$ has a hysteresis voltage equal to $U_H''$, it is a practical requirement that the numerical value $$\left|\frac{U_H'}{U_1'}\right| \text{ or } \left|\frac{U_H''}{U_1''}\right|$$

has the same value at the input terminals for the two trigger circuits. Taking, then, the trigger circuit T*i*1, this will be switched into the conductive condition when the voltage $U_3$ at its input terminals is equal to a value $U_s$. At this time:

$$U_s = U_1' - U_{BE1} \quad (8)$$

and by suitably designing the trigger circuit $$U_H \approx U_H' \quad (9)$$

In like manner the input voltage $U_s$ required to trigger the circuit T*i*2 is obtained from Equation 4 above whereby:

$$U_s \approx (U_v - U_{BE2}) \frac{R3}{R1} - (U_1 - U_{BE1}) \frac{R3}{R2} \quad (10)$$

and $$U_H \approx -U_H'' \frac{R3}{R2}$$

which, by transposing, is equal to $$U_H'' \approx -U_H \frac{R2}{R3} \quad (11)$$

Equation 8 leads to the determination of the switching voltage $U_s$ and Equation 9 leads to the determination of the hysteresis voltage $U_H$ of the trigger circuits T*i*1 and T*i*2.

Substituting Equation 11 in Equation 9 we get:

$$\left|\frac{U_H}{U_1'}\right| \approx \left|\frac{U_H}{U_1''} \cdot \frac{R2}{R3}\right| \quad (12)$$

and thereby $$\frac{R3}{R2} \approx \frac{U_1'}{U_1''} \quad (13)$$

The above Equation 13 determines the proportion R3/R2. The determination of the absolute values for these resistances can, for instance, result from the permitted internal resistance of the source of control voltage $U_2$ for the trigger circuit T*i*2 which responds to the lower value of input signal voltage $U_1$. The choice of the auxiliary voltage $U_v$ and of the resistor R1 follows from Equation 10 by dividing throughout by R3 and transposing terms whereby the following equation is obtained:

$$\frac{U_v - U_{BE2}}{R1} \approx \frac{U_s}{R3} + \frac{U_1'' - U_{BE1}}{R2} \quad (14)$$

The absolution value of the auxiliary voltage $U_v$ can be determined from knowing the voltage between the positive and negative lines of the circuit and the control region of the input signal voltage $U_1$ as measured between the upper and lower limits. The Equation 14 derived from the circuit of FIGURE 4 may be modified by reducing the influence of the base-emitter volt drop $U_{BE2}$ of the transistor T2 in the way described with reference to FIGURE 3, namely, by suitably connecting a diode D1 in series with the auxiliary voltage $U_v$. The presence of diode D1 is to transform the Equations 8, 10 and 14 so that they respectively appear as the following Equations 15 to 17 where R1 is equal to R2:

$$U_s = U_1' - (U_{BE1} - U_{D1}) \approx U_1' \quad (15)$$

$$U_s \approx [U_v - U_1'' - (U_{BE2} - U_{BE1})] \frac{R3}{R2} \approx [U_v - U_1''] \frac{R3}{R2} \quad (16)$$

$$U_v \approx U_s \frac{R2}{R3} + U_1'' + (U_{BE2} - U_{BE1}) \approx U_1'' + U_s \frac{R2}{R3} \quad (17)$$

Figure 5:
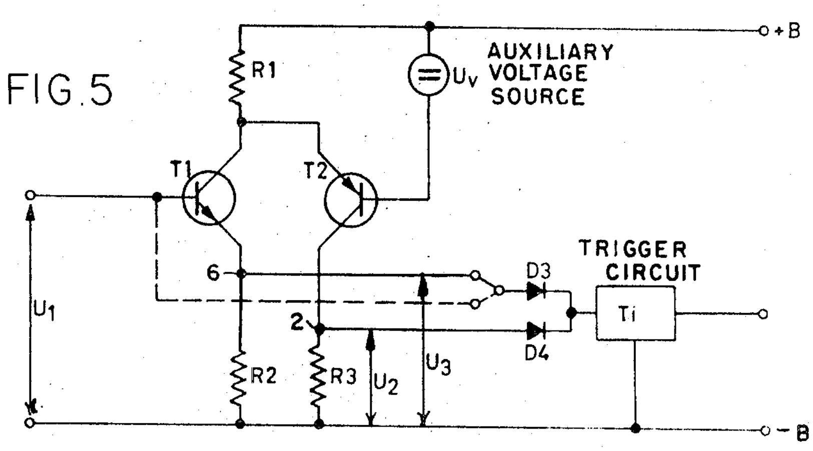
FIG. 5 shows yet a further modification of the FIG. 4 circuitry wherein two identical triggers are replaced by a single trigger with suitable diodes to assure proper respective upper and lower voltage limit operation.

The circuit shown in FIGURE 5 is a further development of the circuit shown in FIGURE 4 in that the two identically operating trigger circuits T*i*1 and T*i*2 are replaced by a single trigger circuit Ti which provides an output for excursion of the input signal voltage $U_1$ through either the upper or the lower level. This of course assumes a common criterion for both the upper limit $U_1'$ and the lower limit $U_1''$, such criterion being, for example, the order in which they occur. The single trigger circuit T*i* is coupled to output terminals 2, 6 of the two transistors T2, T1 by way of diodes D3, D4. An alternative connection for the anode of diode D3 is shown in broken line as connected to the base of the transistor T1.

Figure 6:
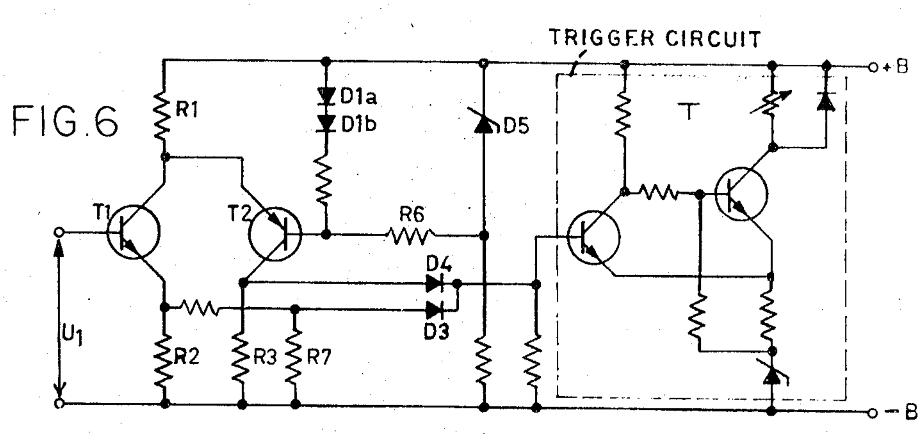
FIG. 6 shows another development of the FIG. 5 circuitry with separate limit controls to provide for independently varying the predetermined voltage limit responses of the circuitry.

FIGURE 6 shows the preferred embodiment of the invention and is a development of the circuit of FIGURE 5 in which the upper limit $U_1'$ of the input voltage $U_1$ is controlled by means of a resistor R7, and the lower limit of the input signal voltage $U_1$ is controlled by a resistor R6. Once again a common criterion is given for both of the limits of excursion of the input signal voltage $U_1$ and the control of the limits by the resistors R6, R7 enables the limits to be altered independently of one another so that the trigger circuit, shown diagrammatically within the broken frame, does not itself need to be adjusted. It will be seen that the base voltage of transistor T2 is controlled through resistor R6 from the voltage appearing at the negative side of a Zener diode D5. The purpose of the two diodes D1*a* and D1*b* is to compensate for the influence of the base-emitter voltage of the second transistor T2 and also the effect of temperature upon the characteristic of the Zener diode D5.

I claim:

1. An electronic circuit including triggering circuitry providing an output signal signifying the excursion of an input signal through pre-arranged upper and lower limits, the circuit containing: a phase splitter formed by a complementary pair of transistors having the collector of the first transistor, to the base of which the input signal is applied, connected to the emitter of the second transistor and through a resistance with one side of a unidirectional electrical supply; a source of reference voltage connected between said one side of said electrical supply and the base of the second transistor; two resistors connected between the other side of the supply and, respectively, the emitter of the first transistor and the collector of the second transistor; electrical connections extending from an output terminal of the phase splitter to the triggering circuitry for triggering it when the input signal crosses the lower limit; and, further connections extending from the input circuit of the first transistor to the triggering circuitry for triggering it when the input signal crosses the upper limit.

2. A circuit as claimed in claim 1, in which the input signal is applied to the base of the first transistor and said further connections extend from its base to the triggering circuitry.

3. A circuit as claimed in claim 1, in which the input signals are applied to the base of the first transistor and said further connections extend from the triggering circuitry to the emitter of the first transistor which is connected to behave as an emitter follower.

4. A circuit as claimed in claim 1, in which the first transistor has its emitter and collector connected, respectively, to the two sides of said electrical supply through ohmic resistances of the same value.

5. A circuit as claimed in claim 1, in which the source of reference voltage is connected in series with a suitably connected rectifier for reducing the influence of the base-emitter voltage of the second transistor on the signal fed to the triggering circuitry.

6. A circuit as claimed in claim 1, in which signals transmitted through said further connections pass through a diode, connected in the low resistance direction, for reducing influence of temperature on the base-emitter current of the first transistor which has its collector and emitter connected to respective sides of said electrical supply through ohmic resistances of equal value.

7. A circuit as claimed in claim 1, in which the triggering circuitry comprises two, similarly-constructed separate trigger circuits which respond, respectively, to the input signal exceeding the two limits, and components making up the complete circuit are so chosen that the relative hystereses of the two trigger circuits for respective limits are substantially equal.

8. A circuit as claimed in claim 1, in which said connections and said further connections both include diodes connected in the low-resistance direction to an input terminal of a single trigger circuit providing an output signal signifying the input signal crossing either of the limits.

References Cited

UNITED STATES PATENTS

| | | | |
|---|---|---|---|
| 3,117,253 | 1/1964 | Antoszewski. | |
| 3,166,678 | 1/1965 | Fleshman et al. | |
| 3,171,978 | 3/1965 | Weber | 307—288 X |
| 3,272,997 | 9/1966 | Kimura | 307—235 |

JOHN F. COUCH, Primary Examiner

A. D. PELLINEN, Assistant Examiner

U.S. Cl. X.R.

307—235, 313; 317—148.5